United States Patent
Harron et al.

(10) Patent No.: US 10,970,588 B2
(45) Date of Patent: *Apr. 6, 2021

(54) RECURRENT DEEP NEURAL NETWORK SYSTEM FOR DETECTING OVERLAYS IN IMAGES

(71) Applicant: Gracenote, Inc., Emeryville, CA (US)

(72) Inventors: Wilson Harron, Berkeley, CA (US); Irene Zhu, San Francisco, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,536

(22) Filed: Nov. 29, 2019

(65) Prior Publication Data

US 2020/0104625 A1 Apr. 2, 2020

Related U.S. Application Data

(63) Continuation of application No. 15/793,352, filed on Oct. 25, 2017, now Pat. No. 10,503,998.
(Continued)

(51) Int. Cl.
*G06K 9/00* (2006.01)
*G06K 9/46* (2006.01)
(Continued)

(52) U.S. Cl.
CPC .......... *G06K 9/4609* (2013.01); *G06K 9/34* (2013.01); *G06K 9/344* (2013.01); *G06K 9/4628* (2013.01);
(Continued)

(58) Field of Classification Search
CPC ........ G06K 9/4609; G06K 9/34; G06K 9/344; G06K 9/4628; G06K 2209/01;
(Continued)

(56) References Cited

U.S. PATENT DOCUMENTS 5,341,142 A * 8/1994 Reis ...................... F41G 7/2226
244/3.15
6,578,021 B1 * 6/2003 Barillaud ............ H04L 12/4641
706/20
(Continued)

OTHER PUBLICATIONS

Gers, Felix et al., Recurrent Nets that Time and Count, IDSIA, Lugano, Switzerland, Jul. 2000 (6 pages).
(Continued)

*Primary Examiner* — Amir Alavi
(74) *Attorney, Agent, or Firm* — McDonnell Boehnen Hulbert & Berghoff LLP

(57) ABSTRACT

In one aspect, an example method includes a processor (1) applying a feature map network to an image to create a feature map comprising a grid of vectors characterizing at least one feature in the image and (2) applying a probability map network to the feature map to create a probability map assigning a probability to the at least one feature in the image, where the assigned probability corresponds to a likelihood that the at least one feature is an overlay. The method further includes the processor determining that the probability exceeds a threshold, and responsive to the processor determining that the probability exceeds the threshold, performing a processing action associated with the at least one feature.

20 Claims, 12 Drawing Sheets

Related U.S. Application Data

(60) Provisional application No. 62/421,639, filed on Nov. 14, 2016, provisional application No. 62/418,517, filed on Nov. 7, 2016.

(51) Int. Cl.
  *G06N 3/04* (2006.01)
  *G06K 9/34* (2006.01)
  *G06N 3/08* (2006.01)

(52) U.S. Cl.
  CPC ......... *G06N 3/0445* (2013.01); *G06N 3/0454* (2013.01); *G06N 3/0472* (2013.01); *G06N 3/0481* (2013.01); *G06N 3/08* (2013.01); *G06K 2209/01* (2013.01)

(58) Field of Classification Search
  CPC .. G06N 3/0445; G06N 3/0454; G06N 3/0472; G06N 3/0481; G06N 3/08; G06T 7/277
  See application file for complete search history.

(56) References Cited

U.S. PATENT DOCUMENTS

| | | | | |
|---|---|---|---|---|
| 8,135,199 | B2* | 3/2012 | Russakoff | G06K 9/6209 382/132 |
| 8,380,384 | B2* | 2/2013 | Lee | G06T 7/246 701/28 |
| 8,436,913 | B2 | 5/2013 | Lanz | |
| 8,818,099 | B2* | 8/2014 | Tian | G06K 9/38 382/176 |
| 9,514,363 | B2* | 12/2016 | Sigal | G06K 9/6263 |
| 9,767,381 | B2* | 9/2017 | Rodriguez-Serrano | G06F 16/54 |
| 9,846,840 | B1* | 12/2017 | Lin | G06F 16/5854 |
| 10,354,168 | B2 | 7/2019 | Bluche | |
| 10,503,998 | B2* | 12/2019 | Harron | G06N 3/0481 |
| 10,572,725 | B1* | 2/2020 | Becker | G06K 9/00442 |
| 10,699,135 | B2* | 6/2020 | Zhang | G08G 1/167 |
| 2004/0076984 | A1* | 4/2004 | Eils | G16B 40/00 435/6.13 |
| 2010/0124364 | A1 | 5/2010 | Huo et al. | |
| 2018/0005379 | A1 | 1/2018 | Den Hartog et al. | |
| 2018/0129899 | A1 | 5/2018 | Harron et al. | |
| 2018/0336454 | A1 | 11/2018 | Lim et al. | |

OTHER PUBLICATIONS

Hochreiter, Sepp et al., Long Short-Term Memory, Neural Computation 9(8):1735-1780, 1997 (32 pages).

Huiskes, Mark et al., The MIRFLICKR Retrieval Evaluation (image collection, complete manual annotations and open software), downloaded Oct. 25, 2017 from the world-wide web at http://press.liacs.nl/mirflickr/ (5 pages).

Huval, Brody et al., An Empirical Evaluation of Deep Learning on Highway Driving, arXiv, Apr. 2015 (7 pages).

Schuster, Mike et al., Bidirectional Recurrent Neural Networks, IEEE Transactions on Signal Processing, vol. 45, No. 11, Nov. 1997, pp. 2673-2681 (9 pages).

Sermanet, Pierre et al., OverFeat: Integrated Recognition, Localization and Detection using Convolutional Networks, arXiv, Feb. 2014 (16 pages).

Simonyan, Karen et al., Very Deep Convolutional Networks for Large-Scale Image Recognition, ICLR, arXiv, Apr. 2015 (14 pages).

* cited by examiner

RECURRENT DEEP NEURAL NETWORK SYSTEM FOR DETECTING OVERLAYS IN IMAGES

CROSS-REFERENCE TO RELATED APPLICATIONS

This application is a continuation of U.S. patent application Ser. No. 15/793,352, filed Oct. 25, 2017, which claims priority to U.S. Provisional Patent Application No. 62/418,517, filed Nov. 7, 2016, and U.S. Provisional Patent Application No. 62/421,639, filed Nov. 14, 2016. All of the aforementioned applications are incorporated herein by reference in their entireties.

USAGE AND TERMINOLOGY

In this disclosure, unless otherwise specified and/or unless the particular context clearly dictates otherwise, the terms "a" or mean at least one, and the term "the" means the at least one.

SUMMARY

In one aspect, an example method is disclosed. The method includes a processor (1) applying a feature map network to an image to create a feature map comprising a grid of vectors characterizing at least one feature in the image and (2) applying a probability map network to the feature map to create a probability map assigning a probability to the at least one feature in the image, where the assigned probability corresponds to a likelihood that the at least one feature is an overlay. The method further includes the processor determining that the probability exceeds a threshold. Upon determining that the probability exceeds the threshold, the method includes performing a processing action associated with the at least one feature.

In another aspect, an example non-transitory computer-readable medium is disclosed. The computer-readable medium has stored thereon program instructions that upon execution by a processor, cause performance of a set of acts including applying a feature map network to an image to create a feature map comprising a grid of vectors characterizing a feature in the image, applying a probability map network to the feature map to create a probability map assigning a probability to the feature in the image, where the assigned probability corresponds to a likelihood that the feature is an overlay, determining that the probability exceeds a threshold, and upon determining that the probability exceeds the threshold, and performing a processing action associated with the feature.

In yet another aspect, a system is disclosed. The system includes a processor configured to execute program instructions to cause functions to be performed. Those functions include training a feature map network by generating a plurality of groundtruth masks from a corresponding plurality of training images, where each of the plurality of training images has an overlay with at least one of a respective grayscale intensity, color hue, color value, color intensity, opacity, size, or position that differs relative to other overlays in the plurality of training images. Another function performed is applying the trained feature map network to an image to create a feature map, where the feature map includes data characterizing a feature in the image relative to other features in the image, where the feature map network comprises a very deep convolutional neural network having a plurality of convolutional layers and max-pooling layers. Yet another function performed is applying a probability map network to the feature map to create a probability map, where the probability map network comprises at least two recurrent layers including at least one vertical recurrent layer and at least one horizontal recurrent layer that are multiplied to provide an output indicative of a probability that the feature in the image is an overlay. Still yet another function performed is determining that the probability exceeds a threshold. Upon determining that the probability exceeds the threshold, a processing action associated with the feature is performed, where the processing action is selected from the group consisting of removing the feature from the image and inpainting the feature.

DETAILED DESCRIPTION

I. Overview

Figure 12:
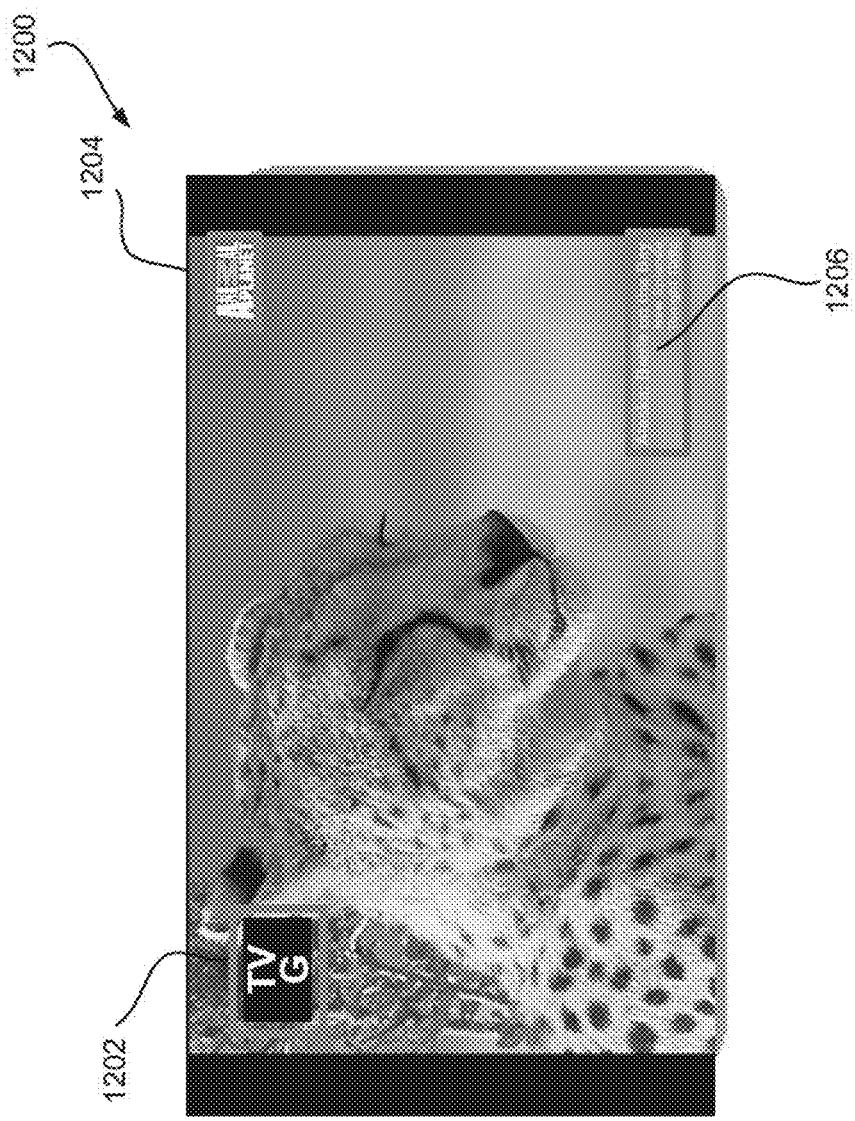
FIG. 12 is an example image with overlays.

Embodiments of the systems and methods described herein can be used to detect semitransparent or opaque overlays, such as logos and/or text, in images, such as stills captured from TV shows or other media presentations. For example, FIG. 12 is a simplified diagram of an image 1200 with overlays, including an opaque rating overlay 1202, a semitransparent station identifier overlay 1204, and a semitransparent advertising overlay 1206. A detector that is invariant to size, color, and opacity is designed to locate overlays commonly found in broadcast TV streams, for example. In some embodiments, the system uses a deep recurrent neural network to produce a probability map of the areas where one or more overlays are likely to be present n the image. Using this probability map, a mask can be made to extract the one or more of the overlays for further processing action(s). Such further processing actions could include additional inspection, removal (e.g. using an inpainting algorithm), channel recognition (e.g. using Optical Character Recognition (OCR)), or tracking, such as for determining compliance with advertising contracts, for example, in which compensation is based on whether an overlay is present in a particular image or sequence of images.

In conventional logo removal techniques, a human editor is required to manually view and mark unwanted regions (e.g. an overlay) in each image (or series of images) to create a mask with an overlay location, to which a conventional inpainting algorithm can be applied to create a modified image with the overlay removed. Unlike in these conventional logo removal techniques, the systems and methods described herein utilize machine learning principles to determine which areas are likely to contain an overlay. For example, the utilized machine learning principles include one or more aspects relating to neural networks, such as recurrent deep neural networks utilizing a Long Short-Term Memory (LSTM) architecture in two directions (e.g. horizontal and vertical) in an image.

As a result the technology described herein provides an improvement to the technical field of image processing, and, in particular, to improving speed and reliability of detecting overlays in images, with reduced or eliminated human oversight.

II. Example Architecture

A. Computing Device

Figure 1:
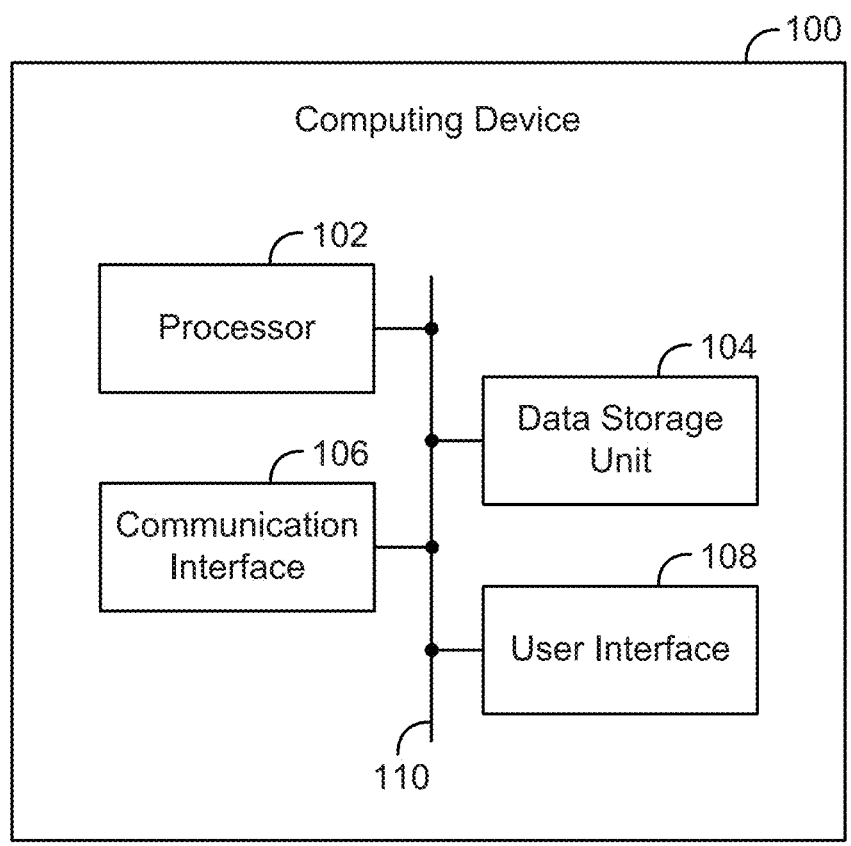
FIG. 1 is a simplified block diagram of an example computing device.

FIG. 1 is a simplified block diagram of an example computing device 100. The computing device 100 can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet, High-Definition Multimedia interface (MIDI), or coaxial interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a remote control, a touch-sensitive panel, and/or a microphone, and/or output components such as a display device (which, for example, can be combined with a touch-sensitive panel), a sound speaker, and/or a haptic feedback system.

The computing device 100 can take various forms, such as a server, a workstation terminal, a desktop computer, a laptop, a tablet, a mobile phone, a set-top box receiver, and/or a TV.

B. Example Systems

Figure 2:
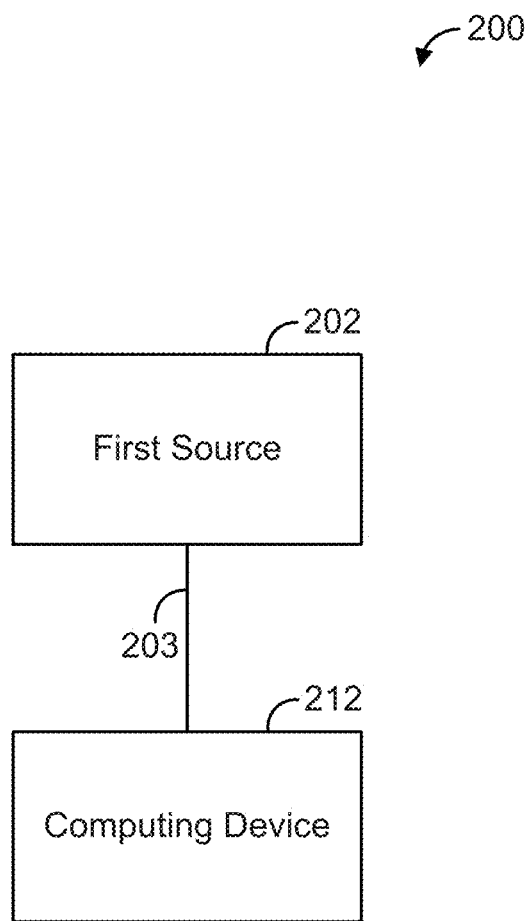
FIG. 2 is a simplified block diagram of an example system for detecting overlays.

FIG. 2 is a simplified block diagram of an example system 200. The system 200 can perform various acts and/or functions related to detecting overlays in images, and can be implemented as a computing system. In this disclosure, the term "computing system" means a system that includes at least one computing device. In some instances, a computing system can include one or more other computing systems.

The system 200 can include various components, such as a first image source (referred to herein as a "first source") 202 and a computing device 212, both of which can be implemented as a computing system. The system 200 can also include a connection mechanism 203, which connects the first source 202 with the computing device 212.

The first source 202 can take various forms. For example, the first source 202 can be a broadcaster and/or a web server. In some cases, the first source 202 can be integrated together with a distributor (not shown), such as a multi-channel distributor (e.g., a local content provider, a cable provider, a satellite provider, an over-the-air broadcast provider, and/or a web aggregator) and/or an Internet service provider. As another alternative, the first source 202 can be a database, such as a local image database stored locally on a computer-readable medium and/or a remote image database administered by one or more servers.

The computing device 212 can each take various forms as well. For example, the computing device 212 can take the form of the computing device 100 illustrated in FIG. 1. The computing device 212 can include a cable receiver, a satellite receiver, an over-the-air broadcast receiver, and/or a streaming media receiver to receive one or more images, such as in an image stream. The computing device 212 can also include a user interface, including an input device and/or an output device. For example, the input device could include a mouse, keyboard, touchscreen or other input mechanism, while the output device could include a TV or another display device, a loudspeaker or another audio device, and/or a printing device.

Figure 3:
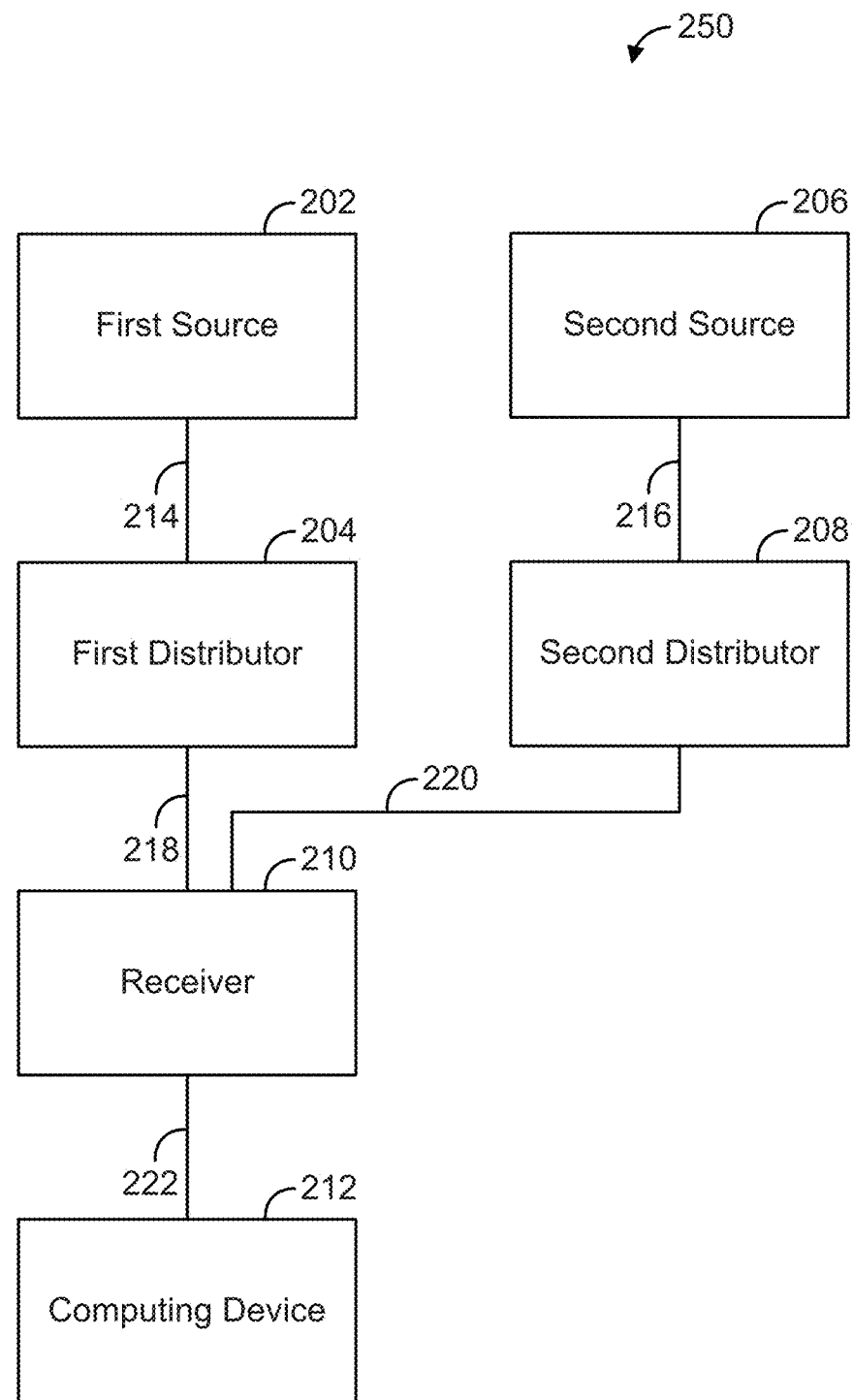
FIG. 3 is a simplified block diagram of another example system for detecting overlays.

FIG. 3 is a simplified block diagram of a system 250. Like the system 200, the system 250 can perform various acts and/or functions related to detecting overlays in images, and can be implemented as a computing system.

The system 250 can include various components, such as the first image source (referred to herein as the "first source") 202 (see FIG. 2), a first image distributor (referred to herein as a "first distributor") 204, a second image source (referred to herein as a "second source") 206, a second image distributor (referred to herein as a "second distributor") 208, an image receiver (referred to herein as a "receiver") 210, and/or the computing device 212 (see FIG. 2), each of which can be implemented as a computing system.

The system 250 can also include a connection mechanism 214, which connects the first source 202 with the first distributor 204; a connection mechanism 216, which connects the second source 206 with the second distributor 208; a connection mechanism 218, which connects the first distributor 204 with the receiver 210; a connection mechanism 220, which connects the second distributor 208 with the receiver 210; and a connection mechanism which connects the receiver 210 with the computing device 212. In practice, the system 250 is likely to include many of some or all of the example components described above, which can allow for many image sources to provide media content to many computing devices or other types of devices, such as display devices (e.g. TVs).

The first source 202 and the first distributor 204 can each take various forms. For example, the first source 202 can be a broadcaster and/or a web server, and the first distributor 204 can be a multi-channel distributor (e.g., a local content provider, a cable provider, a satellite provider, an over-the-air broadcast provider, and/or a web aggregator) and/or an Internet service provider. Likewise, the second source 206 and the second distributor 208 can take various forms such as the respective examples provided above. In some cases, the first source 202 and the first distributor 204 can be integrated together. Likewise, the second source 206 and the second distributor 208 can be integrated together.

The receiver 210 and the computing device 212 can each take various forms as well. For example, the receiver can be a cable receiver, a satellite receiver, an over-the-air broadcast receiver, and/or a streaming media receiver, and the computing device 212 can be a TV or another display device, a loudspeaker or another audio device, or a printing device. In some cases, the receiver 210 and the computing device 212 can be integrated together.

Figure 4:
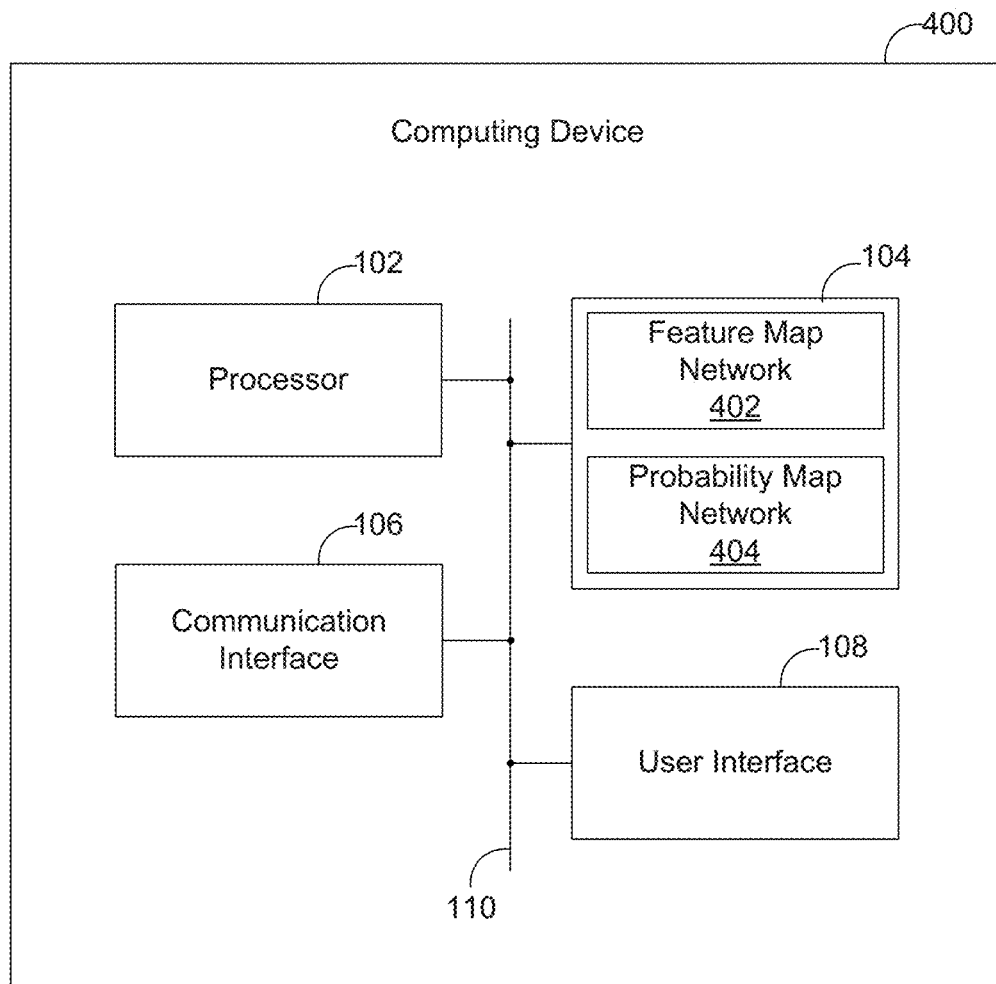
FIG. 4 is a simplified block diagram of a computing device configured to detect overlays in one or more images.

FIG. 4 is a simplified block diagram of a computing device 400 configured to detect overlays in one or more images. The computing device 400 includes the components of the computing device 100 illustrated in FIG. 1 and also includes two additional components: a feature map network 402 and a probability map network 404. The feature map network 402 receives as an input at least one image, such as a plurality of images in an image stream (e.g. video dip), and outputs a feature map, which may be in the form of a grid of feature vectors each having a particular length. The probability map network 404 receives as an input the feature map and learns (via one or more machine-learning techniques, such as those disclosed herein) a map of probabilities ranging from 0 to 1 (with 0 being least probable and 1 being most probable) corresponding to the likelihood that particular pixels (or groups of pixels) are part of an overlay.

Both the feature map network 402 and probability map network 404 in the example of FIG. 4 are neural networks implemented on one or more computing systems that include one or more on-board, off-board, or remote processors, memories, interfaces, and corresponding communicative connections to implement the methods and systems described herein. The one or more co ng systems can take various forms, such as a workstation terminal, a desktop computer, or a laptop, for example. In accordance with the overlay detection systems and methods disclosed herein, the one or more computing systems may access a non-transitory computer-readable medium that has program instructions stored thereon. Upon execution by a processor, the program instructions cause performance of a set of acts that includes applying the feature map network 402 to an image to create a feature map that has data characterizing a feature (e.g. a graphical object) in the image relative to other features in the image. The set of acts further includes applying the probability map network 404 to the feature map to create a probability map assigning a probability to the feature in the image. The assigned probability may be a likelihood that the feature is an overlay, for example. Upon determining that the feature is probably an overlay (i.e. the probability exceeds a threshold), a processing action can be performed on the feature, such as removing the feature (e.g. removing the overlay using an inpainting algorithm), using OCR on the feature to identify a channel or show described by the associated overlay, or tracking, such as for determining compliance with advertising contracts, for example, in which compensation is based on whether an overlay is present in a particular image or sequence of images. Other processing actions may be performed on the feature.

Figure 5:
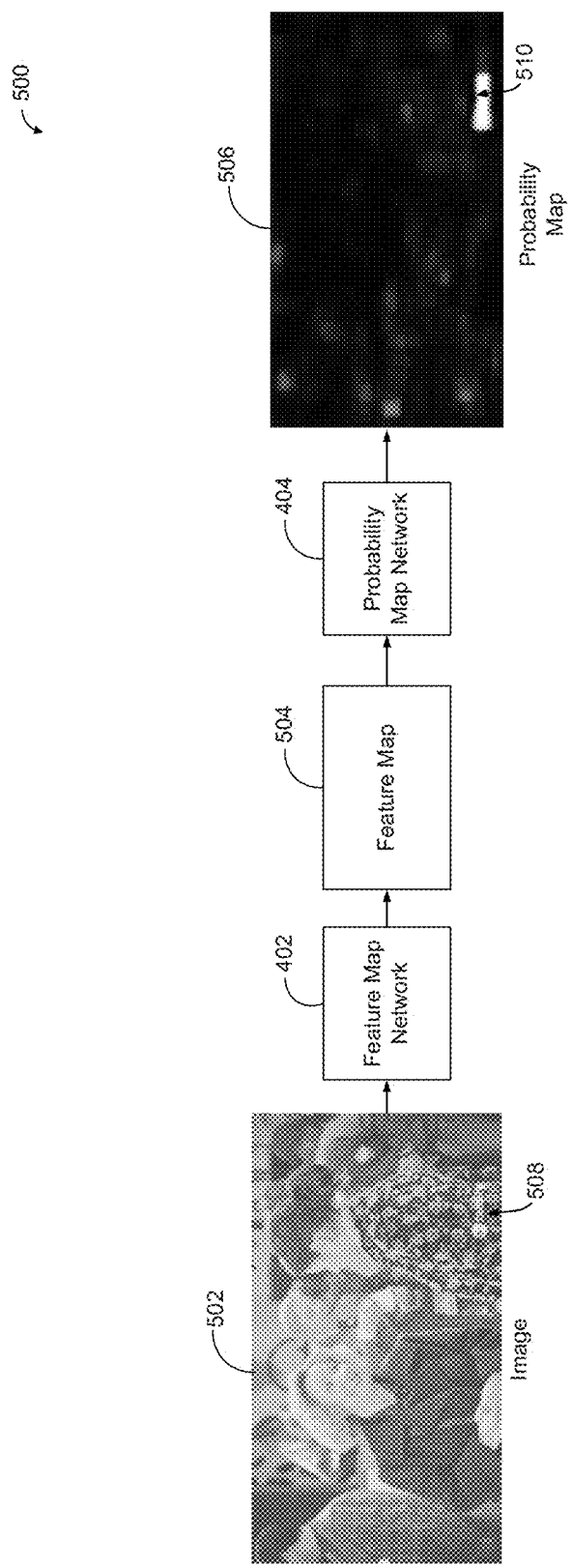
FIG. 5 is a simplified block diagram illustrating a system for detecting an overlay in an image.

FIG. 5 is a simplified block diagram illustrating a system 500 for detecting an overlay in an image. The system 500 can be configured to perform and/or can perform one or more acts and/or functions, such as those described in this disclosure. The system 500 includes the feature map network 402 and the probability map network 404 described above with reference to FIG. 4.

As shown, the feature map network 402 receives an image 502 having an overlay 508, which is one of a plurality of features in the image 502. The image 502 may be described on a per-pixel basis using RGB values, for example. (While the accompanying figures are black-and-white drawings or grayscale images, the technology set forth herein is applicable to both color and grayscale images.) In general, the term "feature" may refer to any group of pixels in the image 502 having some common characteristic of interest, such as adjacent positioning with other pixels having a similar color, brightness, or other characteristic. A typical overlay is a feature having one or more shapes, logos, and/or characters (e.g. letters and/or numbers) that are co-located within a portion of the image 502 (generally not in the center of the image) and that may be, but need not be, of a single, homogeneous color, grayscale, and/or pattern, for example.

Upon receiving the image 502, the feature map network 402 creates a feature map 504 having data characterizing one or more features in the image 502, such as relative to other features in the image 502. The feature map 504 may be a grid of feature vectors each having a corresponding length, such as 4096, for example.

Figure 6:
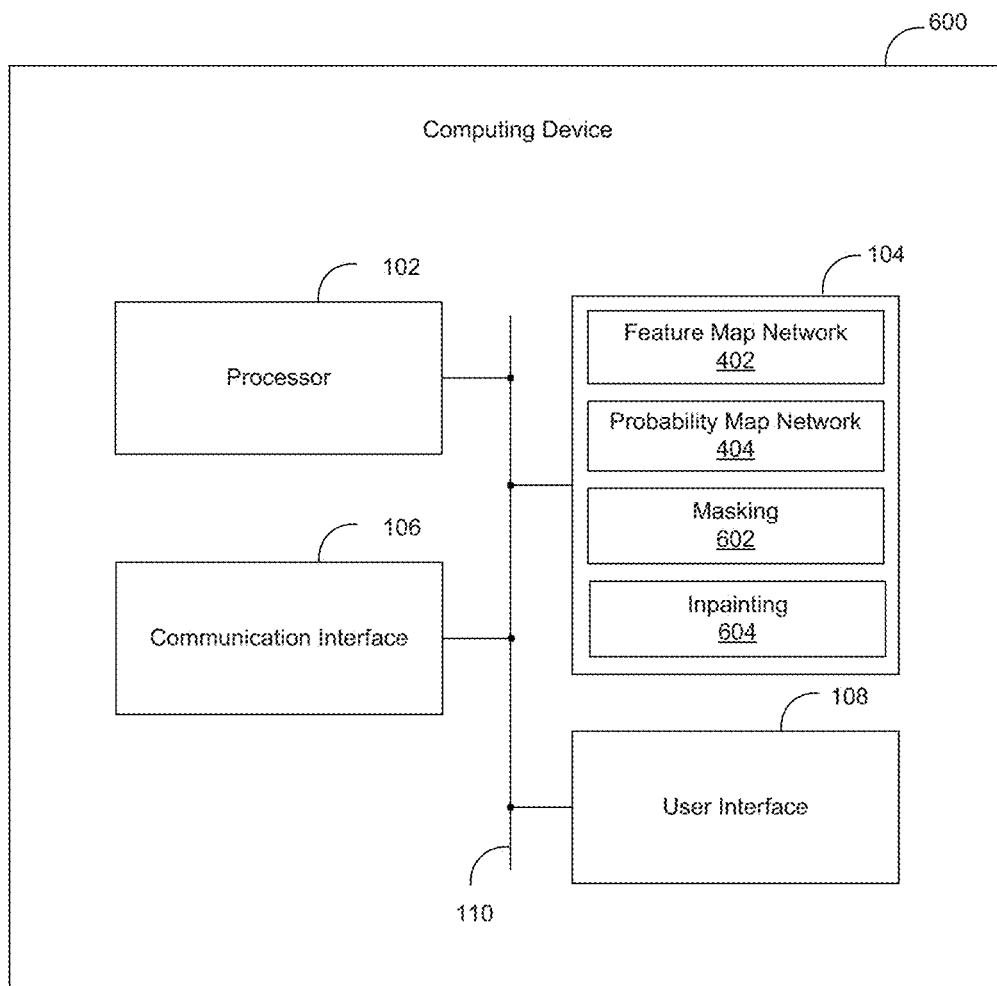
FIG. 6 is a simplified block diagram of a computing device configured to detect an overlay and impaint the detected overlay.
Figure 7:
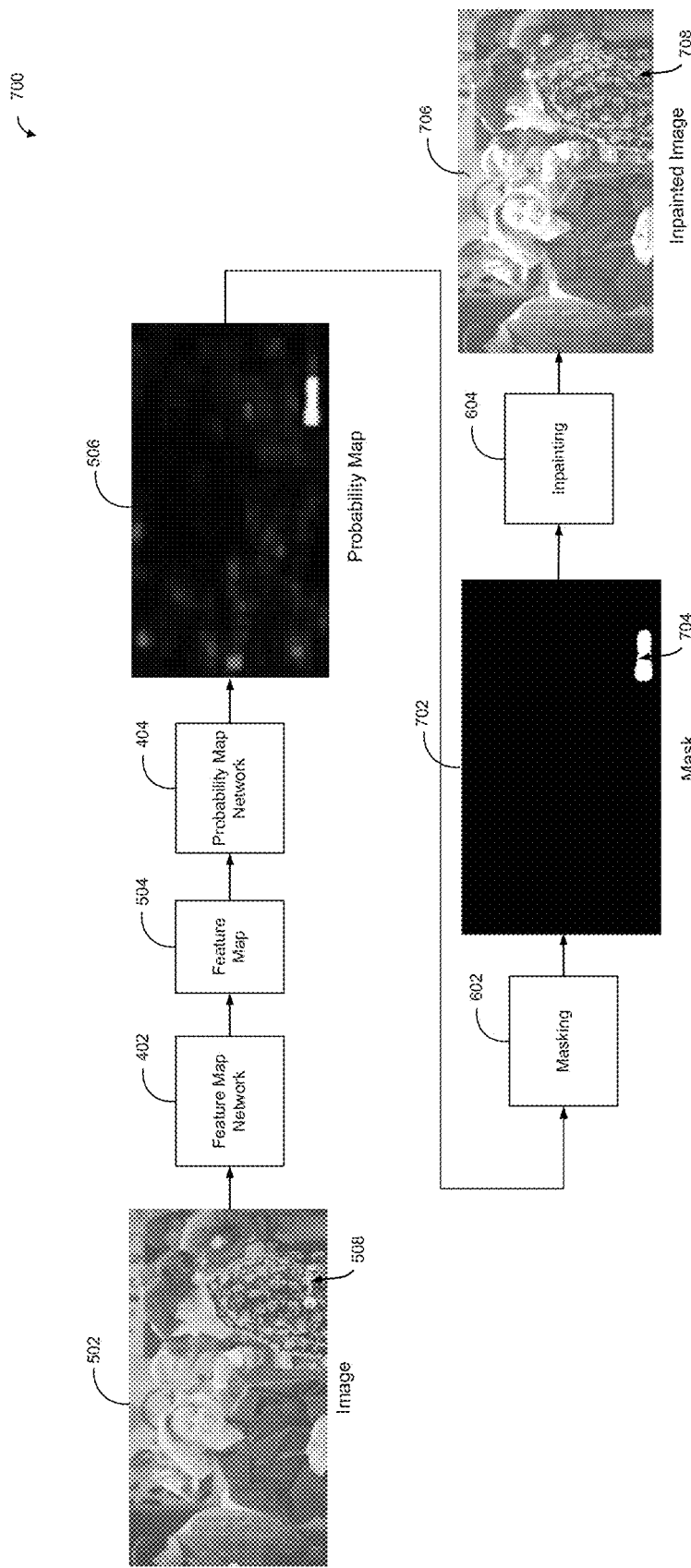
FIG. 7 is a simplified block diagram illustrating a system for detecting an overlay in an image and inpainting the detected overlay.

The probability map network 404 receives the feature map 504 as an input and creates a probability map 506 that assigns a probability to the one or more features in the image 502. The probability may specify a likelihood that a particular feature is an overlay (i.e. that a pixel or group of pixels (e.g. a patch) is part of an overlay). The probability map network 404 and creation of the probability map 504 is described below, with reference to FIG. 9. In the example of FIG. 5, the probability map 506 shows probability ranging from black (zero or near-zero probability) to white (highly probable), such that a feature 510 (corresponding to a probable overlay location) is assigned a high probability (white or 1) of being an overlay (corresponding to the overlay 508 in the image 502). One or more additional acts may be performed on features identified as having a high probability of being an overlay. FIGS. 6 and 7 describe examples of these additional acts that may be performed.

FIG. 6 is a simplified block diagram of a computing device 600 configured to detect overlays and perform one or more acts on the detected overlays. The computing device 600 includes the components of the computing device 400 illustrated in FIG. 4, including the feature map network 402 and the probability map network 404, and also includes two additional components: a masking component 602 and an inpainting component 604.

With reference to FIG. 7, the masking component 602 filters the probability map 506 to create an overlay mask 702. In the case of images captured from a TV show, image components falling in the middle of the image are filtered out, since overlays do not typically appear in such a location (i.e. a target viewing portion of the image) of a TV show. Filtering out unlikely overlay locations can result in a smaller detection error rate, and can make subsequent review or processing easier. The resultant overlay mask 702 may be a binary mask, with only a small portion 704 (corresponding to the overlay 508 in the image 502) indicating a probable location of a detected overlay.

The inpainting component 604 applies a conventional inpainting algorithm to create a modified inpainted image 706 with the overlay removed (i.e. replaced by an inpainted region 708). For example, structural and/or textural inpainting algorithms can be used. Alternatively, the overlay can be replaced with pixels copied from an adjacent portion of the image 706 in a cloning or healing algorithm.

As an alternative to or in addition to inpainting, other acts may be performed on the detected overlay. For example, a detected overlay could be used to track compliance with advertising requirements. A frame counter or time counter could be incremented for images in which a compliant overlay is detected. As another example, some overlays may serve as hyperlinks in some images, such as in videos on media streaming sites, (e.g. clicking a hyperlink displayed while the video is playing will connect the user to a linked site or page, such as a particular channel on the media streaming site.). As yet another example, a detected overlay could be processed using OCR, which could help determine whether the detected overlay includes information that identifies a particular channel, show, or other attribute.

C. Feature Map Network

Figure 8:
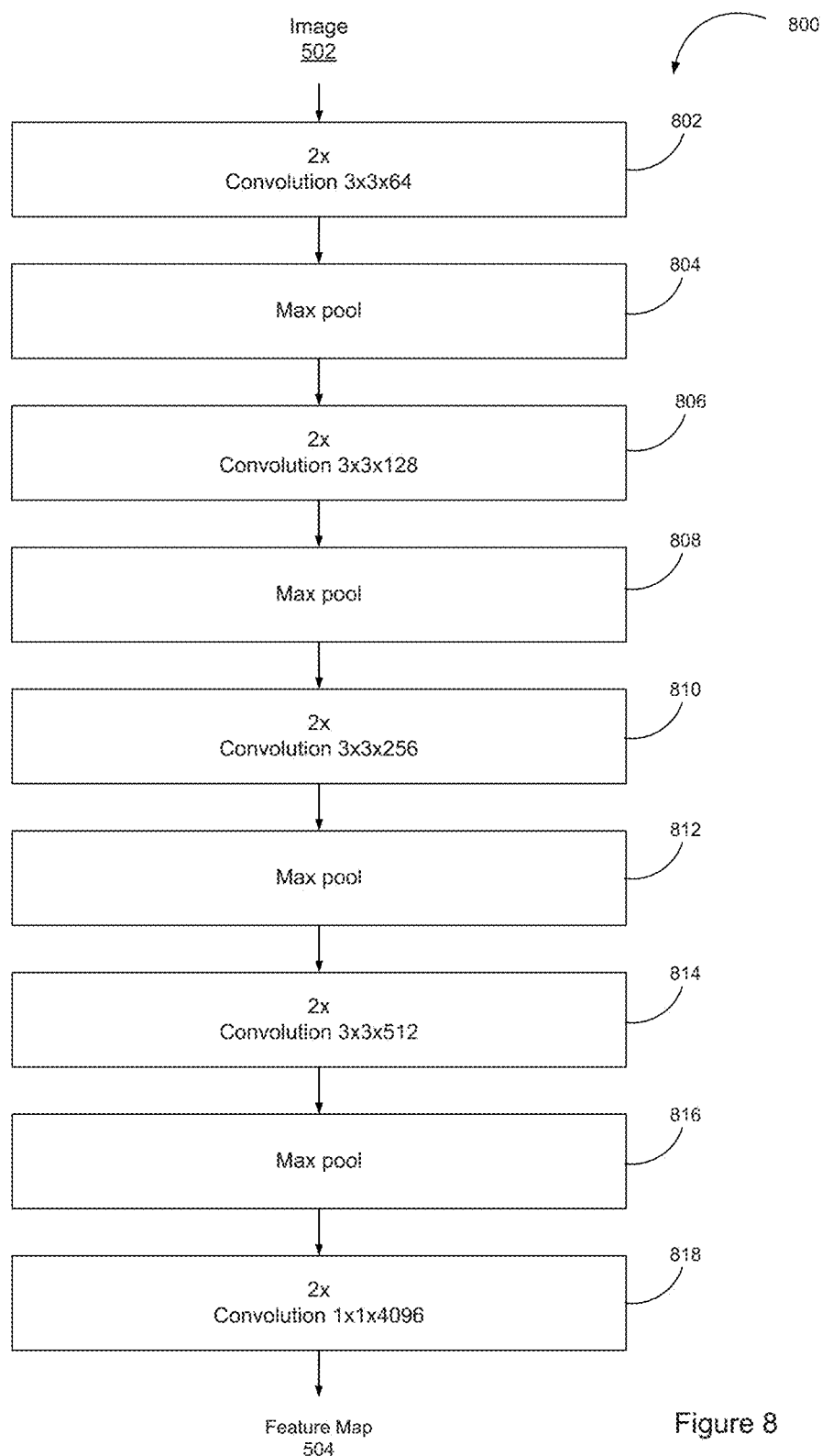
FIG. 8 is a simplified block diagram of an example feature map network.

FIG. 8 is a simplified block diagram of an example feature map network 800. In this example, an image 502 (e.g. described on a per-pixel basis using RGB values) input to the feature map network 800 to produce a feature map 504. In the example of FIG. 8, the feature map network 800 is a convolutional network.

The feature map network 800 includes a plurality of layers selected from convolutional layers and max-pooling layers. In general, each convolutional layer is a rectangular grid of neurons, each of which takes inputs from a weighted rectangular section of the previous layer. The max-pooling layers subsample small rectangular blocks from the previous convolutional layer to produce a single output from that block, corresponding to the maximum of the block they are pooling. The specific arrangement of convolutional layers and max-pooling layers for the feature map network 800 in the example of FIG. 8 will now be described.

As shown, the image 502 is received as an input (described as RGB values) to two 3×3×64 convolutional layers 802, the output of which is subsampled by a max pool layer 804. The output of the max pool layer 804 is an input to two 3×3×128 convolutional layers 806, the output of which is subsampled by a max pool layer 808. The output of the max pool layer 808 is an input to two 3×3×256 convolutional layers 810, the output of which is subsampled by a max pool layer 812. The output of the max pool layer 812 is an input to two 3×3×512 convolutional layers 814, the output of which is subsampled by a max pool layer 816. Two 1×1×4096 convolutional layers 818 are applied to the output of the max pool layer 816 to create the feature map 504, which serves as an output of the feature map network 800. The feature map network 800 is shown in tabular form in Table 1, below.

The feature map network 800 is based on the Visual Geometry Group's (VGG's) ImageNet ILSVRC-2014 submission, Simonyan, Karen and Zisserman, Andrew, "Very Deep Convolutional Networks for Large-Scale Image Recognition," ICLR 2015 Conference Paper, Apr. 10, 2015, accessible as of at least July, 2017 at https://arxiv.org/pdf/1409.1556.pdf, the entirety of which is incorporated by reference herein. Several modifications were made to the 16-layer (VGG-16) model set forth in the aforementioned VGG paper; namely, the last max pool layer, the last three convolutional layers, and the last fully connected layer were removed, resulting in the 12-layer configuration shown in FIG. 8 and in Table 1, below. To generate the feature map 504, consisting of a grid of feature vectors with length 4096, the remaining two fully connected layers are converted to 1×1 convolutional layers, as described in Sermanet et al., "OverFeat: Integrated Recognition, Localization and Detection using Convolutional Networks," Feb. 24, 2014, accessible as of at least July, 2017, at https://arxiv.org/pdf/1312.6229.pdf, the entirety of which is incorporated by reference herein. This results in the feature map network configuration shown in FIG. 800 and in Table 1, below. Given that the feature map network 800 has four pooling (i.e. downsampling) layers, the feature map will be reduced in size compared to the original image and each feature vector in the grid will represent an image patch.

TABLE 1

Feature Map Network Configuration
Input (RGB image)

| |
| --- |
| Conv 3 × 3 64 |
| Conv 3 × 3 64 |
| Max pool 2 × 2 |
| Conv 3 × 3 128 |
| Conv 3 × 3 128 |
| Max pool 2 × 2 |
| Conv 3 × 3 256 |
| Conv 3 × 3 256 |
| Conv 3 × 3 256 |
| Max pool 2 × 2 |
| Conv 3 × 3 512 |
| Conv 3 × 3 512 |
| Conv 3 × 3 512 |
| Max pool 2 × 2 |
| Conv 1 × 1 4096 |
| Conv 1 × 1 4096 |

To train the feature map network 800, a training set for the feature map network 800 may be created. Such a training set may include a set of images with various TV logo overlays superimposed thereon. For example, the Flickr 1M dataset, accessible at http://press.liacs.nl/mirflickr/ as of at least July, 2017, can be used as a base and, for example, may be split into three parts for three different purposes: training (70%), validation (15%), and testing (15%). The overlays for the training set may be created by introducing (e.g. electronically pasting) semi-transparent or opaque images, such as logos, onto the images in the training set. For example, a set of 256 different channel logos can be pasted onto the images in the Flickr 1111 dataset described above. To provide diversity in the training set, the channel logos can be varied by grayscale or full color, opacity (alpha={25, 0.5, 0.75, 1}), size, and position in the image, for example. Creating a training set of images in this way allows relatively easy generation of a corresponding set of groundtruth masks. The groundtruth masks are the same size as the images, with all pixels equal to 0 where the overlaid logo does not overlap and equal to 1 where the overlaid logo does overlap. In one example, the training set images are resized so that the minimum dimension is 540 pixels and are then cropped to 256×256 pixels.

While FIG. 8 and Table 1 describe on feature map network based on VGG, other neural networks may alternatively be used, such as one based on GoogLeNet, a 22-layer deep network, AlexNet, ZF Net, ResNet, and other known neural networks.

D. Probability Map Network

Figure 9:
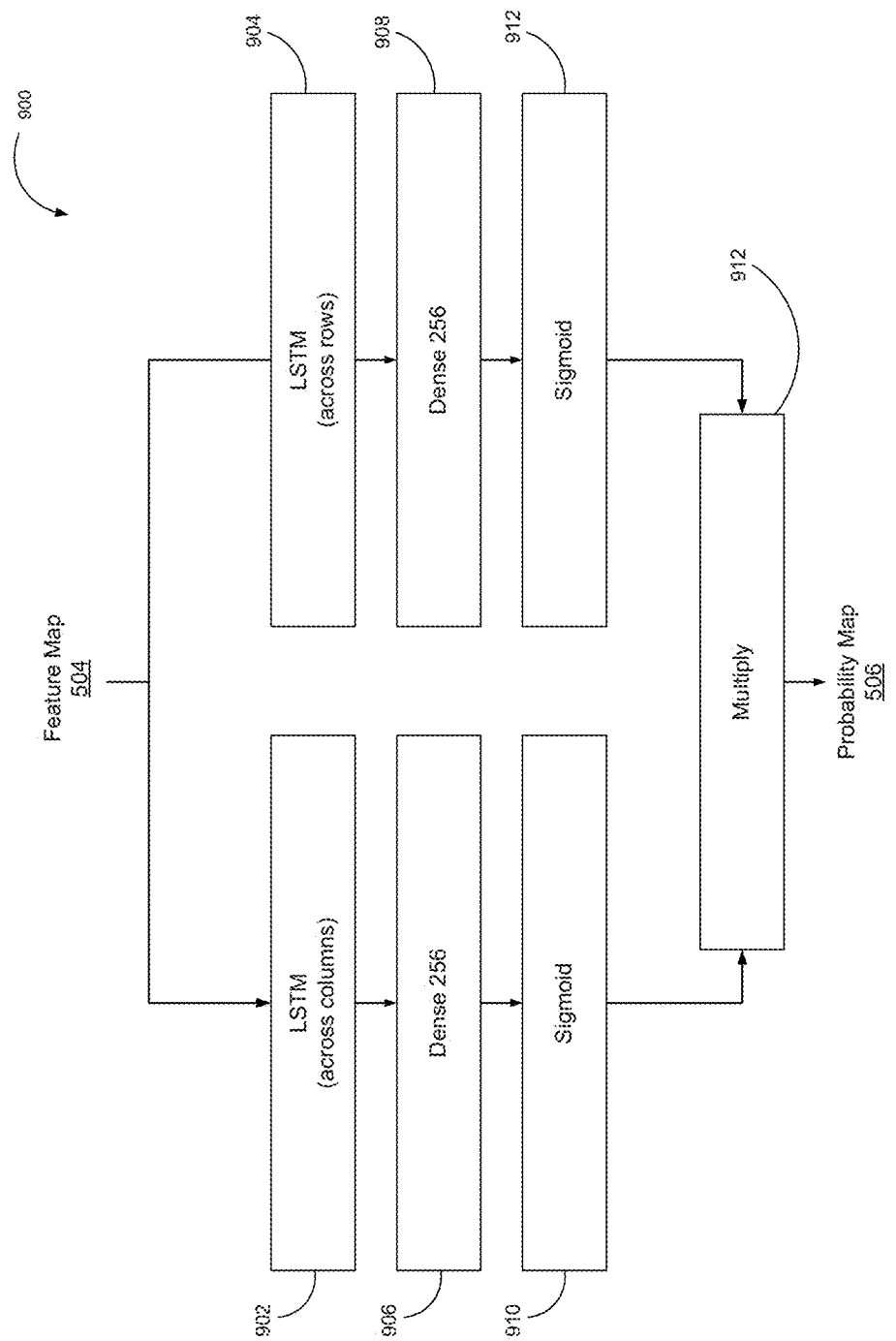
FIG. 9 is a simplified block diagram of an example probability map network.

FIG. 9 is a simplified block diagram of an example probability map network 900. The feature map 504 (from the feature map network 800) is an input to the probability map network 900, which produces the probability map 506, such as in the form of a modified image including a probable overlay location (e.g. feature 510 in FIG. 5). In the example of FIG. 9, the probability map network 900 uses two recurrent layers, one vertical and one horizontal, and combines (multiplies) recurrent layers to output a probability value between 0 and 1. The probability map 506 is used to decide where the overlay is, based on a threshold probability map (e.g. greater than 0.7 probability value corresponds to a probable overlay location).

The probability map network 900 uses available information to determine whether a particular pixel is part of an overlay. For example, if a pixel is highly probable to be part of an overlay, then adjacent pixels should also be likely to be part of the overlay. Accordingly, the probability map network is preferably a recurrent neural network—using long short term memory (LSTM) units, in particular. The feature map network 800 is able to produce deep convolutional representations of the images, while LSTM allows the probability map network 900 to keep track of and use long-term dependencies of these features. This tracking and use of long-term dependencies is described in Hochreiter et al., "Long Short-Term Memory," Neural Computation 9(8): 1735-1780, 1997, accessible as of at least November, 2016, at http://deeplearning.cs.cmu.edu/pdfs/Hochreiter97_lstm.pdf, the entirety of which is incorporated by reference herein.

As illustrated in FIG. 9, the probability map network 900 utilizes bi-directional LSTMs 902 and 904, with peephole connections as described in Gers et al., "Recurrent Nets that Time and Count," accessible as of at least July, 2017, at ftp://ftp.idsia.ch/pub/juergen/TimeCount-IJCNN2000.pdf, the entirety of which is incorporated by reference herein. However, unlike in the speech-recognition system described in Gers et al., the sequences in the probability map network 900 track dependencies vertically (LSTM 902) and horizontally (LSTM 904) in space, rather than forward and backward in time. The sequences for the vertical LSTM 902 are the feature vectors from the feature map 504 that run along each column. The sequences for the horizontal LSTM 904 are the feature vectors from the feature map 504 that run along each row. The results from each sequence of the LSTMs 902 and 904 are passed through separate fully connected layers 906 and 908 with sigmoid nonlinearities 910 and 912. The resulting maps are multiplied together, as shown in block 912; meaning that a particular pixel must have both a high probability of being part of an overlay in the column-wise LSTM 902 and row-wise LSTM 904 to have a high probability overall. In the illustrated example, each LSTM 902 and 904 uses 250 cell states and gradient clipping is set to 0.1. In an alternative embodiment, four LSTMs could be used to improve the probability map 506. The illustrated (two LSTM) model only takes into account pixels that are positioned before the current pixel. Using four LSTMs would take into account the decisions for all four pixels surrounding the current pixel. Other configurations may be possible as well.

The example probability map network 900 described above is not the only possible configuration for detecting overlays in an image. The end application may dictate some configuration details, for example. In arriving at the example configuration of FIG. 9, a different configuration, referred to herein as a "Type I" configuration, was first tried. The Type I configuration determined patch-wise probability, i.e. the probability for a patch in the image to contain a logo. In this Type I network configuration, the final convolutional layer in the feature map has a filter size of 3×3, which results in a patch size of 48×48 with a 16 pixel stride. This also sets the number of outputs in the fully connected layers after the LSTMs to be 1 (i.e. a single probability for each patch). The Type 1 network therefore produces a low resolution probability map, which needs to be upscaled to give pixel-wise probability for the entire image.

Figure 10:
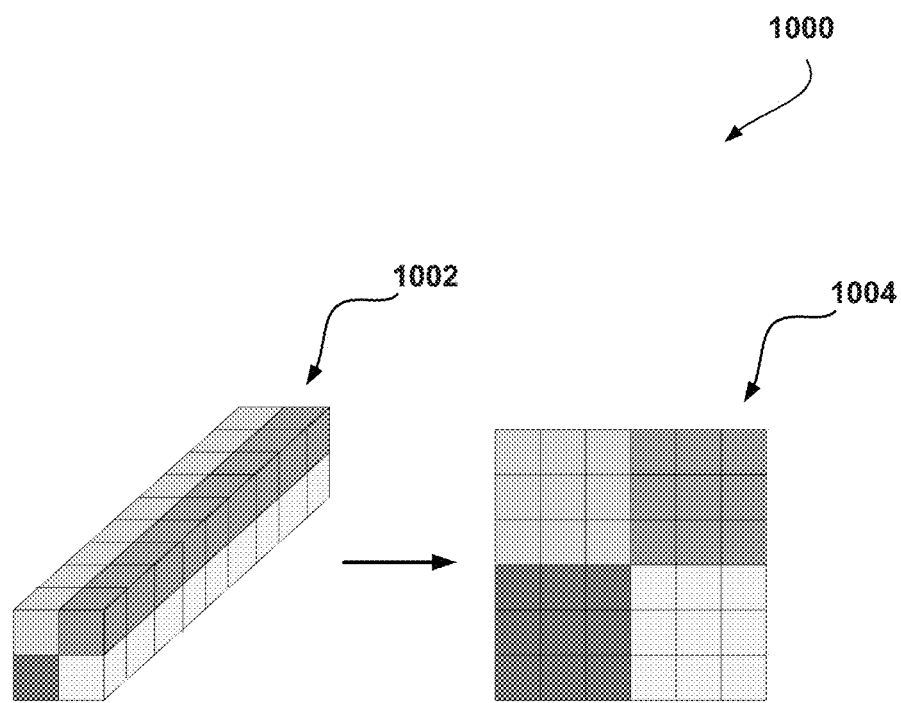
FIG. 10 is a simplified block diagram of illustrating a raveling operation, in which probability vectors are raveled into respective patch positions in a probability map.

To generate a full resolution probability map, a second configuration (a "Type II" configuration) was utilized, in order to obtain a probability vector for each patch. The Type II configuration uses an upscaling technique similar to what is described in Huval et al., "An Empirical Evaluation of Deep Learning on Highway Driving," Apr. 17, 2015, accessible as of at least July, 2017, at https://arxiv.org/pdf/1504.01716v3.pdf, the entirety of which is incorporated by reference herein. This upscaling technique increases detection resolution to cover the entire input image size. The Type II configuration differs from the Type I configuration in several ways. One difference is the creation of smaller patches by reducing the final convolutional layer in the feature map network to 1×1 filters, as show in Table 1 and described above with reference to FIG. 8. Using 1×1 filters provides a new patch size of 16×16 with a 16 pixel stride. The probability vector is a flattened version of the probabilities in each 16×16 patch. To obtain the entire probability map, the probability vectors are raveled into their respective patch positions as shown in FIG. 10, which illustrates 3×3 patches. As illustrated, the RUB probability vector 1002 is raveled to create a 3×3 RUB patch 1004. For this Type II configuration, set forth in FIG. 9 and shown in tabular form in Table 2 below, the fully connected layers following the LSTMs have 16×16=256 outputs. The Type II network provides a tighter detection of overlays and detect more overlays in general.

TABLE 2

| Type II Probability Map Network |
| --- |
| Feature Map |

| LSTM 250 (across rows) | LSTM 250 (across columns) |
| --- | --- |
| Fully Connected 256<br>Sigmoid | Fully Connected 256<br>Sigmoid |
| Multiply | |

The probability map network 900 may utilize a cost function, such as a mean squared error cost function, to arrive at an appropriate probability map 504. In the Type I network described above, a probability is given for each patch. A mean squared error cost function is less strict than one utilizing binary cross entropy; therefore, the mean squared error cost function is more appropriate for the Type I network, as some patches will contain more of an overlay and some patches will contain less. The resulting probability should reflect how much of an overlay was present in a patch, rather than a hard decision about whether a patch contains any part of an overlay at all. For instance, a patch with only 1% of its pixels as part of an overlay should have a much lower probability than a patch that has 100% of its pixels as part of an overlay. Since there is a class imbalance of pixels (i.e. there are more pixels that do not belong to an overlay than ones that do), the cost function weights the error on the pixels that belong to the overlay class more heavily. A mean squared error cost function may be described as follows:

$$SE = (m - M)^2 \quad (1)$$

$$C = \frac{1}{N}(SE + \alpha(M \circ SE)) \quad (2)$$

Where SE is the squared error, m is the prediction, M is the groundtruth mask, N is the number of pixels in the image, α is the weight for the positive class, and ∘ is the Hadamard Product (i.e. element-wise multiplication). Experimental results, set forth below, are based on α=2.5 and L2 normalization with regularization weight of 0.0001.

For the Type I network, the weights of the feature map network were initialized with the weights that were used to achieve the results set forth in Simonyan et al., "Very Deep Convolutional Networks for Large-Scale Image Recognition," ICLR 2015 Conference Paper, Apr. 10, 2015. The trained weights from the Type I network's feature map were then used to initialize the feature map network for the Type II network. Without initializing the weights of the Type ii network with the Type I network weights, no training was observed.

III. Example Methods

Figure 11:
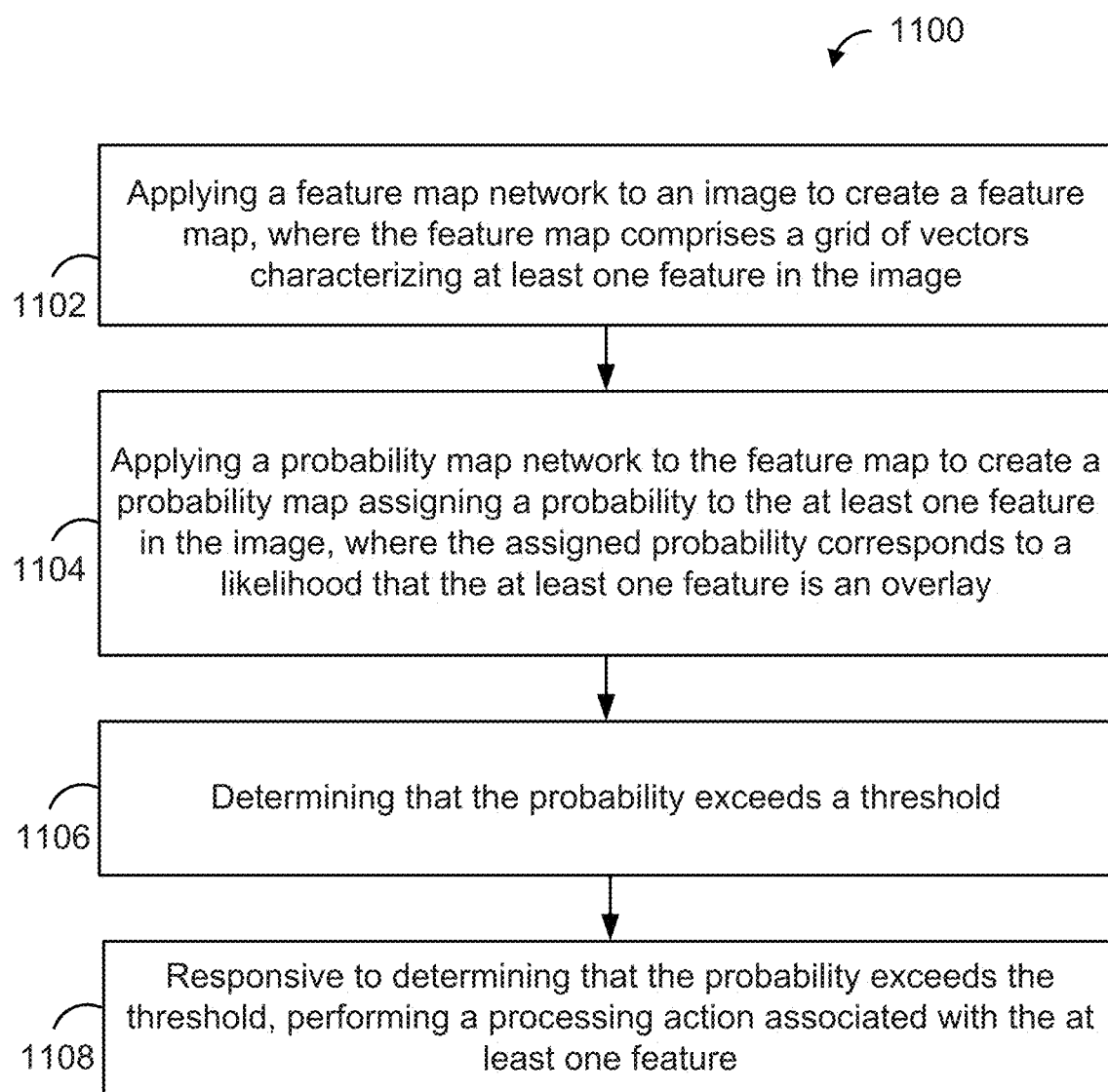
FIG. 11 is a flow chart illustrating an example method for detecting an overlay in an image.

FIG. 11 is a flow chart illustrating an example method 1100.

At block 1102, the method 1100 can include a processor applying a feature map network to an image to create a feature map, where the feature map comprises a grid of vectors characterizing at least one feature in the image. For example, applying the feature map network to the image may include applying a plurality of convolutional layers and max-pooling layers to the image, such as is shown and described with reference to FIG. 8.

At block 1104, the method 1100 can include the processor applying a probability map network to the feature map to create a probability map assigning a probability to the at least one feature in the image. The assigned probability corresponds to a likelihood that the at least one feature is an overlay. For example, the probability map network may be configured as shown and described with reference to FIG. 9.

At block 1106, the method 1100 can include the processor determining that the probability exceeds a threshold.

At block 1108, the method 1100 can include, responsive to determining that the probability exceeds the threshold, performing a processing action associated with the at least one feature. For example, the processing action can be selected from the group consisting of removing the at least one feature from the image, inpainting the at least one feature, determining compliance with an advertising requirement, performing optical character recognition (OCR) on the at least one feature, determining a channel associated with the at least one feature, determining a show associated with the at least one feature, determining a hyperlink associated with the at least one feature, or accessing a hyperlinked object associated with the at least one feature.

The method 1100 can further include training the feature map network prior to the processor applying the feature map network to the image, such as by generating a plurality of groundtruth masks from a corresponding plurality of training images, where each of the plurality of training images has a respective overlay. According to one example, the plurality of training images can be created by placing a plurality of overlay images onto an original image set, where the overlay images are semi-transparent or opaque. In addition, the plurality of overlay images may be varied in at least one of grayscale intensity, color hue, color value, color intensity, opacity, size, or position in the original image set.

IV. Experimental Results

Two different test sets were used to verify the results. One test set is the artificial test set, which is created in a similar way to the training test set with the remaining 15% of the Flickr 1M dataset that were set aside. The other test set is images taken from actual TV shows that have aired. The artificial test sets allows for calculating the pixel-wise accuracy of the predictions, while the test set from actual TV shows illustrates viability in real world scenarios.

A. Artificial Test Set

The artificial test set uses the 15% of the Flickr 1M dataset (i.e. 149999 images) and is created similarly to the training set, described above. The same 256 different channel logos that were used in the training set are pasted onto the images, varying by grayscale or full color, opacity (alpha={0.25,0.5, 0.75,1}), size, and position in the image, for example. The main difference is that after the minimum dimension of the image is resized to 540 pixels, the image is cropped to 288×288 instead of 256×256.

As the Type II network configuration builds on top of Type I (see the description above with reference to FIG. 9), the following results focus on the Type II network. To create masks to compare the prediction with the groundtruth, simple thresholding is performed on the probability map from the network. Pixels whose probability fall above this threshold (e.g. 0.7) are considered to be part of an overlay and pixels that do not are not part of the background. Mean average precision (mAP) and area under the ROC curve (AuC) are suitable evaluation metrics, although others are possible as well.

B. Real World Test Set

A set of 51 images were captured from actual TV shows playing on TV. Using this set shows that this model can be used beyond the artificial data set and in real world applications. The images have a variety of different overlays ranging from logos to text to show ratings. In the 51 captured images, there were 58 total annotated overlays. These included 48 images with at least one or more overlays and three images with no overlays at all. These images are resized so that their minimum dimensions are 540 pixels, and no cropping is performed. However, since these are stills captured from TV, groundtruth cannot be created in the same way as for the artificial set.

In the real world set, a two-step thresholding scheme is performed on the probability map, similar to the one for canny edge detection. There is a high threshold which is first used. Then a lower threshold is used, but only components that touch components which are above the high threshold are kept. The high threshold used is 0.9, and low threshold is 0.25. This two-step thresholding allows the mask to close any gaps between high probability areas. Furthermore, for this case only, and as illustrated in FIG. 9, any components found in the middle of the image were removed, considering that broadcast stations are unlikely to place any overlays in the middle of their content.

Since there are no groundtruth masks available for these images in the same way as for the artificial test images, bounding boxes were annotated around each overlay in the images. Text and logos that are meant to be read together are grouped together into one bounded box. These images are analyzed by determining whether the bounded box of the detection region and groundtruth bounded boxes have an intersection over union of greater (IOU) than 0.5.

To show the improvements of the Type II network over the Type I network, we used the real world test set, as this test set is tougher than the artificial test set. Table 3, below, shows that the Type II network works better in this case. Since the Type II probability network is able to account for all pixels of the input image, its detection results are more accurate. Even though the bounding boxes generated from both network configurations may fit the intersection over union threshold of 0.5, the detections from the Type II configuration are closer to the actual overlay.

TABLE 3

Comparison of Type I and Type II network on the real world test set

|  | Type I | Type II |
| --- | --- | --- |
| True Positives | 26 | 48 |
| False Positives | 23 | 10 |
| False Negatives | 32 | 10 |
| Precision | 0.5306 | 0.8276 |
| Recall | 0.4482 | 0.8276 |
| F score | 0.4859 | 0.8276 |

IV. Example Variations

Although some of the acts and/or functions set forth in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
a processor applying a feature map network to an image to create a feature map, wherein the feature map comprises a grid of vectors characterizing at least one feature in the image;
the processor applying a probability map network to the feature map to create a probability map assigning a probability to the at least one feature in the image, wherein the assigned probability corresponds to a likelihood that the at least one feature is an overlay;
the processor determining that the assigned probability exceeds a threshold probability value; and
responsive to the processor determining that the assigned probability exceeds the threshold probability value, the processor (i) determining compliance with an advertising requirement, (ii) performing optical character recognition (OCR) on the at least one feature, (iii) determining a channel associated with the at least one feature, (iv) determining a show associated with the at least one feature, (v) determining a hyperlink associated with the at least one feature, or (vi) accessing a hyperlinked object associated with the at least one feature.

2. The method of claim 1, further comprising:
responsive to the processor determining that the assigned probability exceeds the threshold probability value, the processor (i) removing the at least one feature from the image or (ii) inpainting the at least one feature.

3. The method of claim 1, further comprising:
training the feature map network prior to the processor applying the feature map network to the image.

4. The method of claim 3, wherein training the feature map network comprises generating a plurality of groundtruth masks from a corresponding plurality of training images, wherein each training image of the plurality of training images has a respective overlay.

5. The method of claim 4, further comprising:
creating the plurality of training images by placing a plurality of overlay images onto an original image set, wherein each overlay image of the plurality of overlay images is semi-transparent or opaque.

6. The method of claim 5, further comprising:
varying the plurality of overlay images by at least one of grayscale intensity, color hue, color value, color intensity, opacity, size, or position in the original image set.

7. The method of claim 1, wherein applying the feature map network to the image comprises applying a plurality of convolutional layers and max-pooling layers to the image.

8. The method of claim 7, wherein the image is described on a per-pixel basis using RGB values, and wherein the plurality of convolutional layers and max-pooling layers comprises the following, in order:
two convolutional 3×3 64-length layers;
a first max-pooling 2×2 layer;
two convolution 3×3 128-length layers;
a second max-pooling 2×2 layer;
three convolution 3×3 256-length layers;
a third max-pooling 2×2 layer;
three convolution 3×3 512-length layers;
a fourth max-pooling 2×2 layer; and
two convolution 1×1 4096-length layers.

9. The method of claim 1, wherein applying the probability map network to the feature map comprises applying the following, in order:
a first LSTM across rows and a second LSTM across columns;
two fully connected layers;
two sigmoid layers; and
a multiplication layer.

10. A non-transitory computer-readable medium having stored thereon program instructions that, upon execution by a processor, cause the processor to perform a set of acts comprising:
applying a feature map network to an image to create a feature map, wherein the feature map includes data characterizing a feature in the image relative to other features in the image;
applying a probability map network to the feature map to create a probability map assigning a probability to the feature in the image, wherein the assigned probability corresponds to a likelihood that the feature is an overlay;
determining that the assigned probability exceeds a threshold probability value; and
responsive to determining that the assigned probability exceeds the threshold probability value, (i) determining compliance with an advertising requirement, (ii) performing optical character recognition (OCR) on the at least one feature, (iii) determining a channel associated with the at least one feature, (iv) determining a show associated with the at least one feature, (v) determining a hyperlink associated with the at least one feature, or (vi) accessing a hyperlinked object associated with the at least one feature.

11. The non-transitory computer-readable medium of claim 10, the set of acts further comprising:
responsive to determining that the assigned probability exceeds the threshold probability value, (i) removing the at least one feature from the image or (ii) inpainting the at least one feature.

12. The non-transitory computer-readable medium of claim 10, the set of acts further comprising:
training the feature map network prior to the processor applying the feature map network to the image, wherein training the feature map network comprises generating a plurality of groundtruth masks from a corresponding plurality of training images, wherein each training image of the plurality of training images has a respective overlay.

13. The non-transitory computer-readable medium of claim 12, wherein each groundtruth mask of the plurality of groundtruth masks is the same size as its corresponding training image, the set of acts further comprising:
setting each pixel in a respective groundtruth mask of the plurality of groundtruth masks to 1 if the pixel is overlapped by the respective overlay or to 0 if the pixel is not overlapped by the respective overlay.

14. The non-transitory computer-readable medium of claim 12, the set of acts further comprising:
creating the plurality of training images by placing a plurality of overlay images onto an original image set, wherein each overlay image of the plurality of overlay images is semi-transparent or opaque.

15. The non-transitory computer-readable medium of claim 10, wherein applying the feature map network to the image comprises applying a plurality of convolutional layers and max-pooling layers to the image.

16. The non-transitory computer-readable medium of claim 15, wherein the image is described on a per-pixel basis using RGB values, and wherein the plurality of convolutional layers and max-pooling layers comprises the following, in order:
two convolutional 3×3 64-length layers;
a first max-pooling 2×2 layer;
two convolution 3×3 128-length layers;
a second max-pooling 2×2 layer;
three convolution 3×3 256-length layers;
a third max-pooling 2×2 layer;
three convolution 3×3 512-length layers;
a fourth max-pooling 2×2 layer; and
two convolution 1×1 4096-length layers.

17. The non-transitory computer-readable medium of claim 10, wherein applying the probability map network to the feature map comprises applying bi-directional LSTMs with peephole connections to the feature map.

18. The non-transitory computer-readable medium of claim 17, wherein the bi-directional LSTMs with peephole connections comprises the following, in order:
a first LSTM across rows and a second LSTM across columns;
two fully connected layers;
two sigmoid layers; and
a multiplication layer.

19. A system, comprising:
a processor; and
a non-transitory computer-readable medium having stored thereon program instructions that, upon execution by the processor, cause the processor to perform a set of acts comprising:
training a feature map network by generating a plurality of groundtruth masks from a corresponding plurality of training images, wherein each of the plurality of training images has an overlay with at least one of a respective grayscale intensity, color hue, color value, color intensity, opacity, size, or position that differs relative to other overlays in the plurality of training images;
applying the trained feature map network to an image to create a feature map, wherein the feature map includes data characterizing a feature in the image relative to other features in the image, wherein the feature map network comprises a very deep convolutional neural network having a plurality of convolutional layers and max-pooling layers;
applying a probability map network to the feature map to create a probability map, wherein the probability map network comprises at least two recurrent layers including at least one vertical recurrent layer and at least one horizontal recurrent layer that are multiplied to provide an output indicative of a probability that the feature in the image is an overlay;
determining that the probability exceeds a threshold probability value; and responsive to determining that the probability exceeds the threshold probability value, (i) determining compliance with an advertising requirement, (ii) performing optical character recognition (OCR) on the feature, (iii) determining a channel associated with the feature, (iv) determining a show associated with the feature, (v) determining a hyperlink associated with the feature, or (vi) accessing a hyperlinked object associated with the feature.

20. The system of claim 19, the set of acts further comprising:

responsive to determining that the probability exceeds the threshold probability value, (i) removing the feature from the image or (ii) inpainting the feature.

\* \* \* \* \*